Sept. 21, 1965

E. D. DITTO 3,207,015

CUTTING TOOL ADJUSTMENT ASSEMBLY

Filed Nov. 4, 1963

INVENTOR.
Edwin D. Ditto
BY
R. L. Spencer
ATTORNEY 3,207,015
CUTTING TOOL ADJUSTMENT ASSEMBLY
Edwin D. Ditto, Ann Arbor, Mich., assignor to General Motors Corporation, Detroit, Mich., a corporation of Delaware
Filed Nov. 4, 1963, Ser. No. 321,022
9 Claims. (Cl. 82—36)

This invention relates generally to tool holders and more particularly to an improved cutting tool adjustment assembly and is directed to improvement on the device shown on my Patent 3,101,020, issued August 20, 1963.

This invention is particularly concerned with the provision of an adjustable cutting tool having no back lash and being capable of accurate micrometer adjustment wherein the cutting tool may be adjusted without the necessity of loosening clamping bolts prior to each adjustment and then tightening the clamping bolts after the adjustment prior to use of the cutting tool.

In the prior art three individual clamping screws were often used to apply vertical, horizontal and transverse forces to hold the adjusting screw in contact with the cutting tool to assure accurate micrometer adjustment.

It is an object of the present invention to provide a spring biasing means for angularly bearing against a clamping block for holding an adjusting screw in full contact with the thread means provided on top of the cutting tool at all times.

Another object of this invention is to provide means to adjust a cutting tool wherein a constant force applied in one direction on a clamping block acts as an orthogonal force system having three component forces for holding the threads of the adjusting screw in contact with the thread means of the cutting tool.

A further object of this invention is to provide a cam surface together with an angular spring force for urging a clamping block to hold a screw member in firm contact with the thread means of a cutting tool thereby making accurate adjustment possible without the necessity of loosening and tightening clamping bolts for each adjustment.

These and other objects and advantages of the present invention will become more apparent as reference is had to the following description and the accompany drawings wherein.

For purposes of this description, the front of the assembly is considered to be the end from which the cutting edge of the tool protrudes. All similar parts in the assembly will have the same reference numerals.

Figure 1:
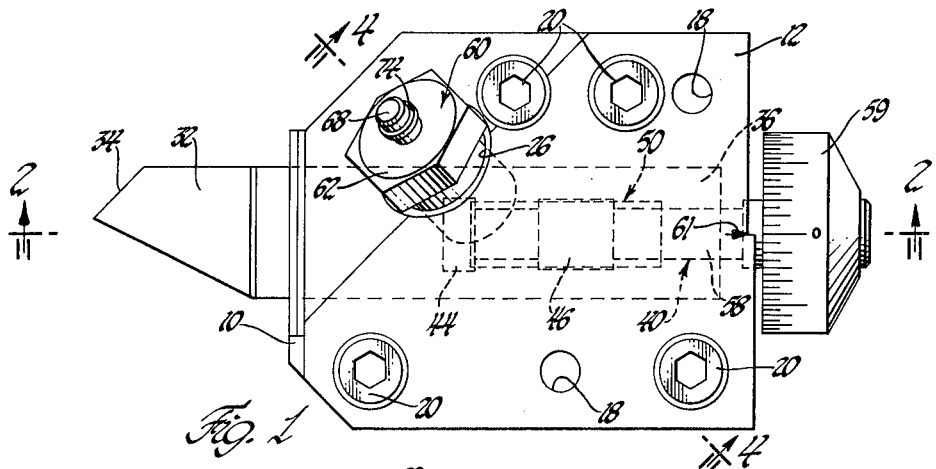
FIGURE 1 is a top elevational view of a cutting tool assembly utilizing the present invention.
Figure 2:
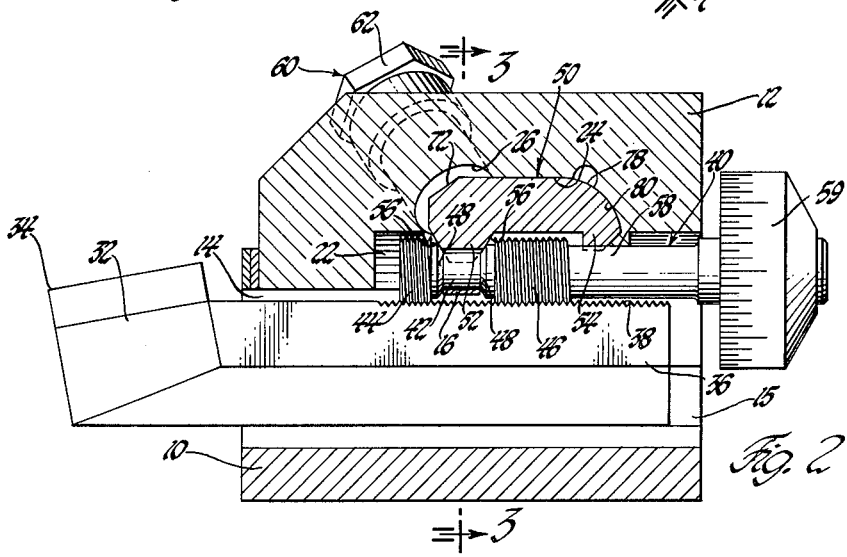
FIGURE 2 is a sectional view taken substantially along the line 2—2 of FIGURE 1 for illustrating the relative positions of the cutting tool, adjustment screw, clamping block and biasing means.
Figure 3:
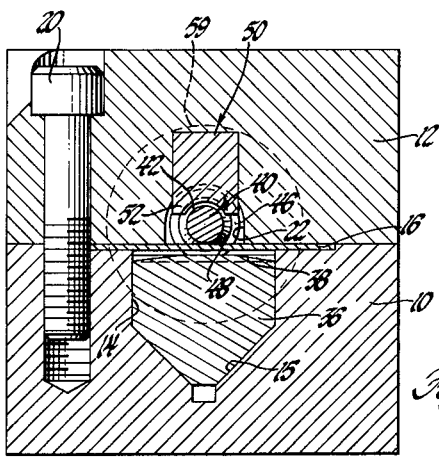
FIGURE 3 is a view in the direction of the arrows taken substantially along the line 3—3 of FIGURE 2 and showing a cross-sectional view of the tool holder, cutting tool, adjusting screw and clamping block.

Referring now to the drawings, as best seen in FIGURES 1 and 2, the cutting tool assembly comprises a housing consisting of a base plate 10 and a cover plate 12. A tool cavity 14 having a V-shaped base 15 is provided on the top surface of the base plate 10. A bearing bar 16 is supported on the top surface of the base plate 10 and spans the cavity 14. Any suitable means such as a plurality of bolt holes 18 have been provided on the base plate to secure the tool block assembly adjacent a work piece.

The cover plate 12 rests on the top surface of the base plate 10 and is secured by a plurality of suitable fastening means such as the bolt members 20. An adjusting screw cavity 22 and a clamping block cavity 24 are provided in the cover plate 12 and are aligned with the cutting tool cavity 14 in the assembled position. A threaded spring assembly hole 26 extends downwardly, rearwardly and sidewardly at an inclined angle from the top surface of the cover plate 12 into the front top side corner of the clamping block cavity 24.

A cutting tool 32 having a cutting edge 34 and a shank portion 36 is slidably seated on the V-shaped base 15 of the cutting tool cavity 14. Thread means 38 are provided on the top of the shank 36 and extend substantially the entire length thereof. An adjusting screw 40 extends within the cavity 22 and is rotatably supported on the bearing bar 16. The inwardly extending end portion of the adjusting screw 40 is provided with a peripheral groove 42 which separates threaded portions 44 and 46 and rotatably supports the screw on the bearing bar 16. The peripheral groove 42 is provided with tapered side surfaces 48. A clamping block 50 is slidably supported in the clamping block cavity 24 and is provided with a pair of spaced downwardly extending lug portions 52, 54. The front lug 52 is adapted for engagement with the peripheral groove 42 and is provided with tapered side surfaces 56 which are slidably engageable with the tapered side surfaces 48 of the groove 42 on the adjusting screw. The rear lug 54 is adapted for engagement with the stem portion 58 of the adjusting screw 40. Sufficient clearance is provided between the lugs 52 and 54 of the clamping block 50 to accommodate the threaded portion 46 of the adjusting screw. A micrometer adjusting knob 59 is secured to the back end of the adjusting screw 40 and is cooperable with the indicia 61 for indicating accurate adjustment of the cutting tool.

Figure 4:
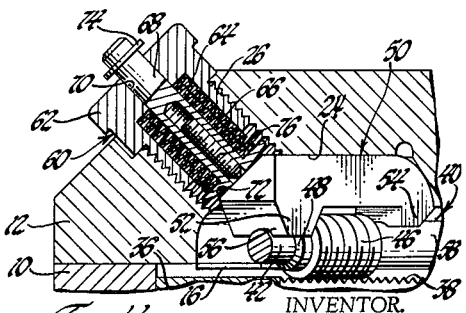
FIGURE 4 is a view taken substantially along the line 4—4 of FIGURE 1 in the direction of the arrows and showing a cross-sectional view of the Belleville washer spring assembly urging the clamping block against the adjusting screw.

As best seen in FIGURE 4, a biasing means 60 is threadably mounted in spring assembly hole 26. The biasing means consists of a case 62 having a threaded exterior for positioning the biasing means within the spring assembly hole 26. The case 62 has a central cavity 64 for containing a series of Belleville washers in stacked relationship forming a Belleville spring 66. A contact stud 68 is centrally positioned in the cavity 64 and extends through an aperture 70 in the case 62. The Belleville spring 64 is positioned about stud 68 and urges the stud against a face 72 on the clamping block 50. The face 72 is substantially perpendicular to the center line of the biasing means 60. A snap ring 74 is positioned about the outer end of stud 68 to limit the movement of the stud when the biasing means is not in contact with the clamping block. An extension pin 76 is threadably positioned in the center of stud 68 for effectively extending the length of the stud when increased spring pressure is needed.

In operation, the cutting tool 32 may be slidably adjustably positioned through the driving action of the threaded portion 44, 46 with the thread means 38 provided on the top of the cutting tool shank 36 by rotation of the adjusting screw 40. In prior apparatus, before the cutting tool could be adjusted it was necessary to loosen clamping screws which, acting through the clamping block, held the adjusting screw 40 in rigid contact with the thread means 38 provided on the top of the cutting tool shank 36. It was also necessary after each adjustment to retighten the clamping screws to secure the adjusting means to the cutting tool and hold the tool in the adjusted position. In the present invention, biasing means 60 exerts a constant force on the clamping block 50 which maintains the threads of the adjusting screw fully engaged with the threads of the thread means 38 on top of the cutting tool shank. The angle of contact of the biasing means with the clamping block provides an orthogonal force system having three component forces acting on the clamping block. One horizontal component force urges the clamping block to the rear of the clamping block cavity 24 where a cam surface 78 of the clamping block cooperates with a mating cam surface 80 of the cavity 24 for directing the rearward force into a downward force for acting through tab 54 to bias the adjusting screw downwardly. A second horizontal component force urges the clamping block sidewardly into the cavity 24 and prevents side movement of the clamping block and adjusting screw. The third vertical component force exerts a downward pressure acting through lug portion 52 on the peripheral groove 42 for holding the front of the adjusting screw in contact with the thread means 38 of the cutting tool. Thus, it can be seen that the biasing means 60 positioned in the clamping block 50 holds the thread 44, 46 of the adjusting screw 40 in constant contact with the threads 38 of the cutting tool 32 thereby holding the cutting tool in its adjusted position. The force of the biasing means 60 may be varied by adjusting the extension pin 76 to obtain the proper force on the clamping block to maintain the desired pressure on the adjusting screw whereby the tool may be accurately adjusted with reference to the calibrated knob and the indicia as needed without the additional steps of loosening and retightening clamping means for each adjustment. Furthermore, the tool will be held in the adjusted position and back lash will be eliminated during the cutting operation by the force of the biasing means.

While the invention is susceptible to variations of the details of construction and arrangement of parts it should be understood that there is no intention to necessarily limit the invention to the specific details disclosed but only to be limited to the spirit and scope of the appended claims.

I claim:

1. A tool block and assembly comprising a base plate, a cutting tool cavity provided in said base plate, a cover plate, an adjusting screw cavity provided in said cover plate, a clamping block cavity provided in said cover plate and aligned with said cutting tool cavity and said adjusting screw cavity, a cutting tool slidably supported in said cutting tool cavity, thread means provided on said cutting tool, an adjusting screw rotatably supported adjacent said cutting tool and extending into said adjusting screw cavity, thread means provided on said adjusting screw and being cooperably engaged with said thread means on said cutting tool, said adjusting screw having a circumferential groove and a stem portion provided thereon, a clamping block slidably supported in said clamping block cavity, lug means provided on said clamping block and engageable with said groove and said stem portion, and spring biasing means for simultaneously applying downward, rearward and sideward thrust force components on said clamping block.

2. A tool block and assembly comprising a base plate, a cutting tool cavity provided in said base plate, a cover plate, an adjusting screw cavity provided in said cover plate, a clamping block cavity provided in said cover plate and aligned with said cutting tool cavity and said adjusting screw cavity, a cutting tool slidably supported in said cutting tool cavity, thread means provided on said cutting tool, an adjusting screw rotatably supported adjacent said cutting tool and extending into said adjusting screw cavity, thread means provided on said adjusting screw and being cooperably engaged with said thread means on said cutting tool, said adjusting screw having a circumferential groove and a stem portion provided on said screw, a clamping block slidably supported in said clamping block cavity, lug means provided on said clamping block and engageable with said groove and said stem portion, and spring biasing means for forcing said clamping block downwardly, rearwardly and sidewardly in said clamping block cavity into engagement with said adjusting screw for holding said screw in engagement with said cutting tool.

3. In a tool assembly, a housing, a guideway in said housing, a cutting tool slidably accommodated in said guideway for fore and aft adjustment, a threaded adjusting screw rotatably engageable with said cutting tool, drive means provided on said cutting tool and being cooperable with said adjusting screw for variably positioning said cutting tool in said guideway, portions of said adjusting screw being of reduced diameter, a recess provided in said housing and located adjacent said adjusting screw, said recess having one wall formed as a cam surface, a clamping member retained in said recess, said clamping member having a cam surface thereon for matingly engaging said cam surface of said recess and a pair of lugs engaging said reduced diameter portions of said screw, spring biasing means angularly contacting said clamping means at one point for urging said clamping means into contact with a side of said recess, said cam surfaces into abutting engagement and said lugs into engagement with said adjusting screw for holding said screw in engagement with said cutting tool.

4. In a tool assembly, a housing, a guideway in said housing, a cutting tool slidably accommodated in said guideway, a threaded adjusting screw rotatably engageable with said cutting tool, drive means provided on said cutting tool and being cooperable with said adjusting screw for variably positioning said cutting tool in said guideway, portions of said adjusting screw being of reduced diameter, a recess provided in said housing and located adjacent said adjusting screw, said recess having one wall formed as a cam surface, a clamping member retained in said recess, said clamping member having a cam surface thereon for matingly engaging said cam surface of said recess and a pair of lugs engaging said reduced diameter portions of said screw, spring biasing means for producing an orthogonal force system having three component forces, one force component for urging said clamping member vertically downward, a second force component for urging said clamping member horizontally sideward in said recess, a third force component for urging said clamping member horizontally rearward in said recess, one of said lugs applying said vertical force to said adjusting screw for holding said screw in contact with said cutting tool, said cam surfaces cooperating for converting said rearward force component into a second vertical force component for applying such force through the other of said lugs to said screw for additionally holding said adjusting screw in contact with said cutting tool.

5. In a tool assembly, a housing, a guideway in said housing, a cutting tool slidably accommodated in said guideway, a threaded adjusting screw rotatably engageable with said cutting tool, drive means provided on said cutting tool and being cooperable with said adjusting screw for variably positioning said cutting tool in said guideway, portions of said adjusting screw being of reduced diameter, a recess provided in said housing and located adjacent said adjusting screw, said recess having one wall formed as a cam surface, a clamping member retained in said recess, said clamping member having a cam surface thereon for matingly engaging said cam surface of said recess and a pair of lugs engaging said reduced diameter portions of said screw, and a spring biased member contacting said clamping means at one point for producing an orthogonal force system having three component forces, one force component for urging said clamping member vertically downward, a second force component for urging said clamping member horizontally sideward in said recess, a third force component for urging said clamping member horizontally rearward in said recess, one of said lugs applying said vertical force to said adjusting screw for holding said screw in contact with said cutting tool, said cam surfaces cooperating for converting said rearward force component into a second vertical force component for applying such force through the other of said lugs to said screw for additionally holding said adjusting screw in contact with said cutting tool.

6. In combination, a tool block and cutting tool assembly comprising a housing, a guideway in said housing, a cutting tool slidably disposed in said guideway and having a portion thereof extending outwardly from said housing for longitudinal adjustment relative to said housing, thread means extending longitudinally on a portion of said cutting tool, an adjusting screw rotatably mounted in said housing adjacent said threaded portion of said cutting tool, thread means on said adjusting screw cooperably engaging said thread means on said cutting tool, said adjusting screw having reduced diameter portions consisting of a circumferential groove and a stem portion, a clamping block cavity in said housing adjacent said adjusting screw, said cavity having a portion thereof formed as a cam surface, a clamping block positioned in said cavity and having lug portions thereon engaging said circumferential groove and said stem portion, respectively, said clamping block having a cam surface for abutting engagement with said cam surface portion of said cavity and an angular face, and spring biased means contacting said angular face of said clamping block and bearing substantially perpendicular to said face for biasing said clamping block against a wall of said recess, against said adjusting screw and against said cam surface of said recess whereby the thread means of said adjusting screw are held in close engagement with said thread means of said cutting tool.

7. In combination, a tool block and cutting tool assembly comprising a housing, a guideway in said housing, a cutting tool slidably disposed in said guideway and having a portion thereof extending outwardly from said housing for longitudinal adjustment relative to said housing, thread means extending longitudinally on a portion of said cutting tool, an adjusting screw rotatably mounted in said housing adjacent said threaded portion of said cutting tool, thread means on said adjusting screw cooperably engaging said thread means on said cutting tool, said adjusting screw having reduced diameter portions consisting of a circumferential groove and a stem portion, a clamping block cavity in said housing adjacent said adjusting screw, said cavity having a portion thereof formed as a cam surface, a clamping block positioned in said recess and having lug portions thereon engaging said circumferential groove and said stem portion, respectively, said clamping block having a cam surface for abutting engagement with said cam surface portion of said cavity and an angular face, spring biasing means contacting said angular face of said clamping block and bearing substantially perpendicular to said face for biasing said clamping block against a wall of said cavity, against said adjusting screw and against said cam surface of said cavity whereby the thread means of said adjusting screw are held in close engagement with said thread means of said cutting tool, said spring biasing means comprising the sole means for applying force to said clamping block for urging said clamping block against said adjusting screw.

8. In combination, a tool block and cutting tool assembly comprising a housing, a guideway in said housing, a cutting tool slidably disposed in said guideway and having a portion thereof extending outwardly from said housing for longitudinal adjustment relative to said housing, thread means extending longitudinally on a portion of said cutting tool, an adjusting screw rotatably mounted in said housing adjacent said threaded portion of said cutting tool, thread means on said adjusting screw cooperably engaging said thread means on said cutting tool, said adjusting screw having reduced diameter portions consisting of a circumferential groove and a stem portion, a clamping block cavity in said housing adjacent said adjusting screw, said cavity having a portion thereof formed as a cam surface, a clamping block positioned in said cavity and having lug portions thereon engaging said circumferential groove and said stem portion, respectively, said clamping block having a cam surface for abutting engagement with said cam surface portion of said cavity and an angular face, a single movable member supported in said housing and being positioned for contacting said angular face of said clamping block, said movable member being effective upon said clamping block to apply a first force component to said clamping block to urge said clamping block against one side wall of said cavity, to apply a second force component to said clamping block to urge said clamping block cam surface into contact with said cavity, cam surface for urging one of said lugs into contact with said stem portion of said adjusting screw and to apply a third force component to urge said clamping block lug into contact with said groove of said adjusting screw, and spring means for urging said movable member into contact with said angular face of said clamping block.

9. In combination, a tool block and cutting tool assembly comprising a housing, a guideway in said housing, a cutting tool slidably disposed in said guideway and having a portion thereof extending outwardly from said housing for longitudinal adjustment relative to said housing, thread means extending longitudinally on a portion of said cutting tool, an adjusting screw rotatably mounted in said housing adjacent said threaded portion of said cutting tool, thread means on said adjusting screw cooperably engaging said thread means on said cutting tool, said adjusting screw having reduced diameter portions consisting of a circumferential groove and a stem portion, a clamping block cavity in said housing adjacent said adjusting screw, said cavity having a portion thereof formed as a cam surface, a clamping block positioned in said cavity and having lug portions thereon engaging said circumferential groove and said stem portion, respectively, said clamping block having a cam surface for abutting engagement with said cam surface portion of said cavity and an angular face, a single movable member supported in said housing and being positioned for contacting said angular face of said clamping block, said movable member being effective upon said clamping block to apply a first force component to said clamping block to urge said clamping block against one side wall of said cavity, to apply a second force component to said clamping block to urge said clamping block cam surface into contact with said cavity, cam surface for urging one of said lugs into contact with said stem portion of said adjusting screw and to apply a third force component to urge said clamping block lug into contact with said groove of said adjusting screw, spring means for urging said movable member into contact with said angular face of said clamping block, and an extension pin adjustably positioned in said movable member for increasing the effective length of said movable member whereby the effective force upon the clamping block may be increased.

No references cited.

ANDREW R. JUHASZ, *Primary Examiner.*